US010156318B2

(12) United States Patent
Liu et al.

(10) Patent No.: US 10,156,318 B2
(45) Date of Patent: Dec. 18, 2018

(54) MONITOR SUSPENSION SYSTEM WITH GAS SPRING AND PULLEY BLOCK

(71) Applicant: GENERAL ELECTRIC COMPANY, Schenectady, NY (US)

(72) Inventors: Hailiang Liu, Beijing (CN); Cong Zhang, Beijing (CN); Min Zhou, Beijing (CN); Shuang Chi, Beijing (CN); Chunlai Zhang, Beijing (CN); Wenrong Pan, Beijing (CN); Shang Gao, Beijing (CN)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 15/275,390

(22) Filed: Sep. 24, 2016

(65) Prior Publication Data

US 2017/0089514 A1  Mar. 30, 2017

(30) Foreign Application Priority Data

Sep. 24, 2015 (CN) .......................... 2015 1 0616141

(51) Int. Cl.
*F16M 11/04* (2006.01)
*F16M 13/02* (2006.01)

(52) U.S. Cl.
CPC ..... *F16M 13/022* (2013.01); *F16M 2200/025* (2013.01)

(58) Field of Classification Search
CPC ....... F16M 2200/025; F16M 2200/047; F16M 11/046

USPC ................... 248/572, 330.1, 332, 334.1, 920
See application file for complete search history.

(56) References Cited

U.S. PATENT DOCUMENTS

| 3,543,282 | A | * | 11/1970 | Lucien | A47B 27/14 108/141 |
| 3,575,368 | A | * | 4/1971 | Thomas | A61B 6/447 248/572 |
| 4,605,189 | A | * | 8/1986 | Bruneau | A47B 27/14 108/146 |
| 5,400,721 | A | * | 3/1995 | Greene | A47B 9/02 108/147 |
| 8,286,927 | B2 | * | 10/2012 | Sweere | A47B 21/0073 108/147 |
| 8,967,560 | B2 | * | 3/2015 | Ergun | A47B 9/12 108/147 |
| 9,188,275 | B2 | * | 11/2015 | Ergun | A47B 21/02 |

(Continued)

*Primary Examiner* — Bradley Duckworth
(74) *Attorney, Agent, or Firm* — GE Global Patent Operation; Marc A. Vivenzio

(57) ABSTRACT

The exemplary non-limiting embodiments described herein provide a display suspension device and related display device. In at least one embodiment, the display suspension device includes: a vertical slider, which is connected to a display so as to guide the display to slide in the vertical direction; a suspension part, with one end of the suspension part joined with the vertical slider and the other end connected to a suspension point; an air spring, which is located on the suspension part and used to retain the location of the vertical slider when the vertical slider stops sliding; a movable pulley, a rotation shaft of which is connected to a piston rod of the air spring; and a cable, which winds around the movable pulley, with one end of the cable connected to the suspension part and the other end connected to the vertical slider.

20 Claims, 6 Drawing Sheets

(56) References Cited

U.S. PATENT DOCUMENTS

| | | | |
|---|---|---|---|
| 9,222,616 B2* | 12/2015 | Ergun | F16M 11/10 |
| 9,232,855 B2* | 1/2016 | Ergun | A47B 9/02 |
| 9,267,639 B2* | 2/2016 | Sweere | F16M 11/30 |
| 9,976,699 B2* | 5/2018 | Hung | F16M 13/02 |
| 2012/0175480 A1* | 7/2012 | Lee | F16M 11/046 |
| | | | 248/295.11 |

* cited by examiner

MONITOR SUSPENSION SYSTEM WITH GAS SPRING AND PULLEY BLOCK

CROSS-REFERENCE TO RELATED APPLICATIONS

This application claims foreign priority benefits under 35 U.S.C. 119(a) to Chinese Application No. 201510616141.0, filed on Sep. 24, 2015, which is incorporated by reference herein in its entirety.

TECHNICAL FIELD

The exemplary non-limiting embodiments described herein relate to the field of suspension devices, and in particular to suspension devises for displays.

BACKGROUND

A display suspension device is a device that can suspend a display and move the display in a certain direction. In some application scenarios, it needs to suspend multiple displays overhead via the ceiling or a wall of a room, and these displays are required to be able to move in the horizontal and/or vertical direction or to rotate a certain angle. A display suspension device is a device that can suspend a display and move the display in a certain direction.

When the display has a large size or there are a large number of displays, the total weight is enormous, which requires the display suspension device to be able to reliably support the display(s). Particularly, the reliability of the display suspension device should still be guaranteed even after a long period of frequent movements of the display.

However, the components and structure in existing display suspension devices cannot meet the above requirements.

SUMMARY

One exemplary non-limiting embodiment provides a display suspension device, including a vertical slider, which is connected to a display so as to guide the display to slide in the vertical direction; and a suspension part, with one end of said suspension part joined with the vertical slider and the other end connected to a suspension point. The display suspension device further comprises an air spring, which is located on the suspension part and used to retain the location of the vertical slider when the vertical slider stops sliding; a movable pulley, a rotation shaft of which is connected to a piston rod of the air spring; and a cable, which winds around the movable pulley, with one end of the cable connected to the suspension part and the other end connected to the vertical slider.

Another exemplary non-limiting embodiment provides a display device including a display suspension device; and one or more displays installed on the display suspension device.

BRIEF DESCRIPTION OF THE DRAWINGS

The exemplary non-limiting embodiments of the present invention will be better understood by the descriptions provided herein in conjunction with the accompanying drawings. In the drawings.

DETAILED DESCRIPTION

In the following detailed description, reference is made to the accompanying drawings that form a part hereof, and in which is shown by way of illustration specific exemplary non-limiting embodiments, which may be practiced. These exemplary non-limiting embodiments are described in sufficient detail to enable those skilled in the art to practice the embodiments, and it is to be understood that other embodiments may be utilized and that logical, mechanical, electrical and other changes may be made without departing from the scope of said embodiments. The following detailed description is, therefore, not to be taken in a limiting sense.

Unless otherwise defined, technical or scientific terms used in the claims and specification should be the general meaning understood by those skilled in the art related to the exemplary non-limiting embodiments described herein. The terms "first", "second" and the like used in the specification and the claims are merely used to distinguish different components, rather than denoting any order, quantity, or importance. The term "one" or "a/an" or the like denotes the presence of at least one, rather than representing a quantitative restriction. The words "comprising," "including," "having" or the like should be construed as open-ended transitional phrases unless otherwise stated and, thus, an element or object recited before any of said transitional phrases encompasses the element or object or equivalent element listed after such phrase while not excluding other elements or objects. The term "connected" or "connected with each other" or the like is neither limited to physical or mechanical connections, nor to direct or indirect connections.

Figure 1:
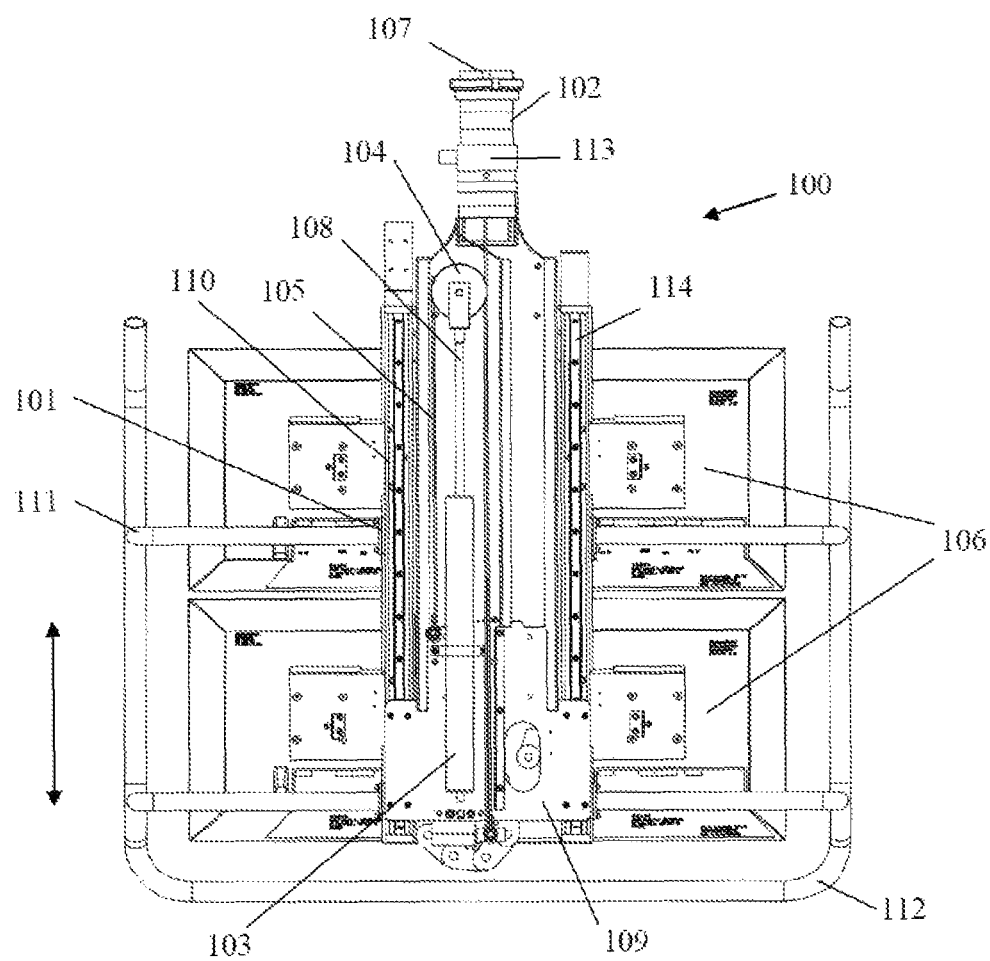
FIG. 1 shows an exemplary non-limiting embodiment of a display suspension device.

Referring to FIG. 1, an exemplary non-limiting embodiment of a display suspension device 100 is shown. The display suspension device 100 may comprise a vertical slider 101, a suspension part 102, an air spring 103, a movable pulley 104 and a cable 105.

The vertical slider 101 may be connected to a display 106 so as to guide the display 106 to slide in the vertical direction (the direction indicated by two-directional arrow as shown in FIG. 1), i.e., the display 106 may be fixed on the vertical slider 101.

One end of the suspension part 102 may be joined with the vertical slider, and the other end may be connected to the suspension point 107. In at least one exemplary non-embodiment embodiment, a guide rail may be installed on the vertical slider 101, and a guide slot corresponding in terms of size and position to the guide rail may be installed on the suspension part 102, so that the vertical slider 101 may slide with respect to the suspension part 102.

The air spring 103 may be located on said suspension part 102, and when the vertical slider 101 stops sliding, the air spring 103 may retain the position of the vertical slider 101. A rotation shaft of the movable pulley 104 may be connected to a piston rod 108 of the air spring 103. The cable 105 may wind around the movable pulley 104, and one end of the cable 105 may be connected to the suspension part 102, and the other end may be connected to the vertical slider 101.

In the embodiment as shown in FIG. 1, the air spring 103 may be arranged in a direction parallel to the vertical sliding direction (the direction indicated by two-directional arrow as shown in FIG. 1, so that it only needs to provide a movable pulley without a fixed pulley. According to the sliding travel actually needed, there may be only one movable pulley, or may be multiple movable pulleys.

Figure 2:
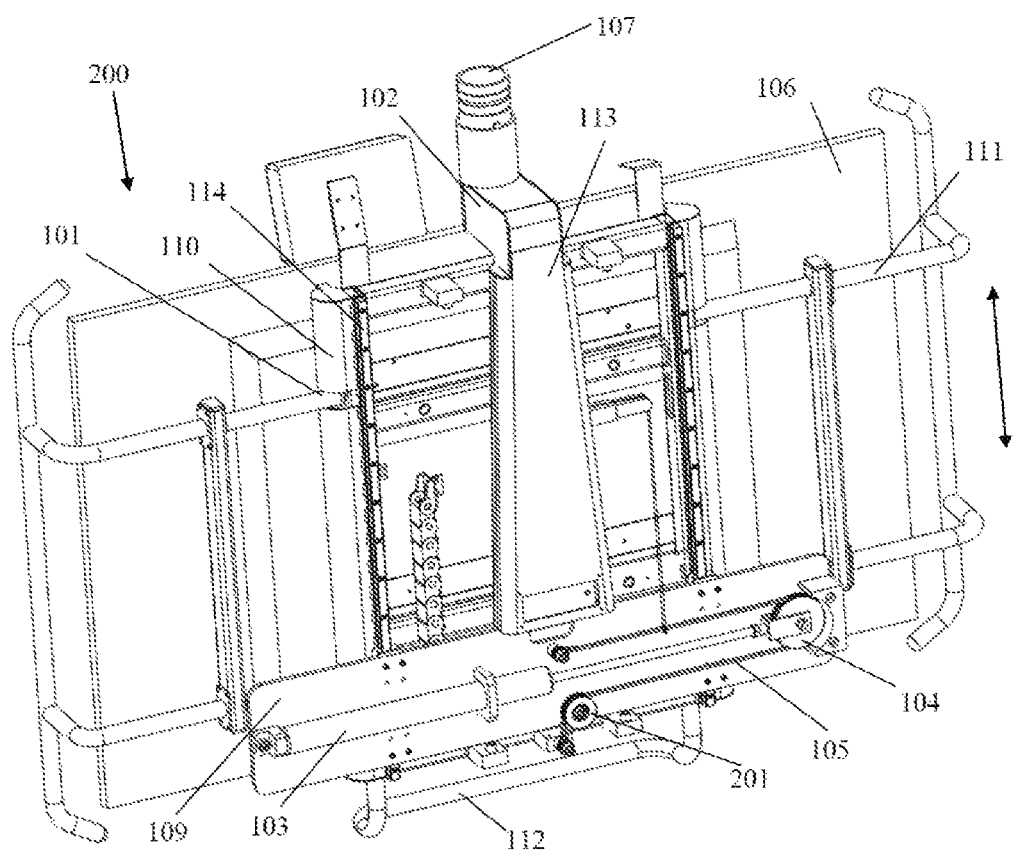
FIG. 2 shows another exemplary non-limiting embodiment of the display suspension device.

Now referring to FIG. 2, an exemplary non-limiting embodiment of a display suspension device 200 is shown. The display suspension device 200 as shown in FIG. 2 differs from the display suspension device 100 in FIG. 1 mainly in that the air spring 103 in the display suspension device 200 may be arranged in a direction parallel to the vertical sliding direction (the direction indicated by two-directional arrow as shown in FIG. 2). Therefore, the display suspension device 200 may further comprise a fixed pulley 201, which may be located on the suspension part 102. Accordingly, the cable 105 may wind around the movable pulley 104 and the fixed pulley 201 in sequence.

Figure 3:
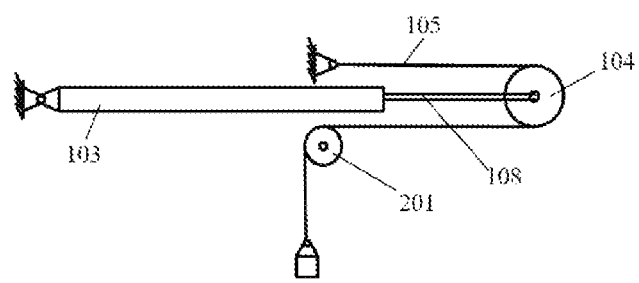
FIG. 3 shows an exemplary non-limiting of the locations and connections between an air spring, a pulley and a cable in the embodiment as shown in FIG. 2.

With reference to FIG. 2 in conjunction with FIG. 3, in the display suspension device 200 as shown in FIG. 2, a movable pulley 104 and a fixed pulley 201 may be respectively provided.

Figure 4:
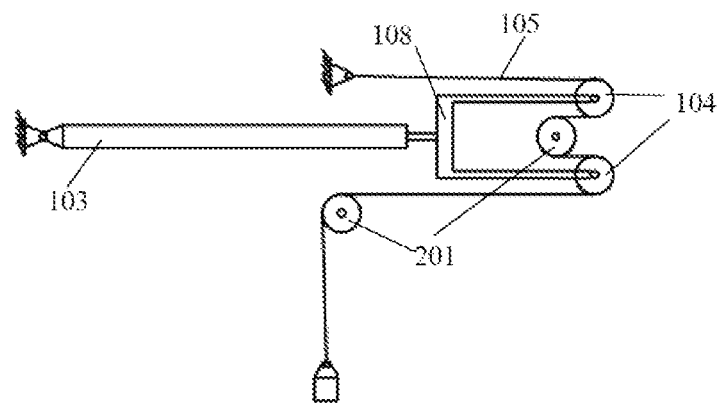
FIG. 4 shows an exemplary non-limiting embodiment of the locations and connections between the air spring, pulley and cable in the embodiment as shown in FIG. 2.
Figure 5:
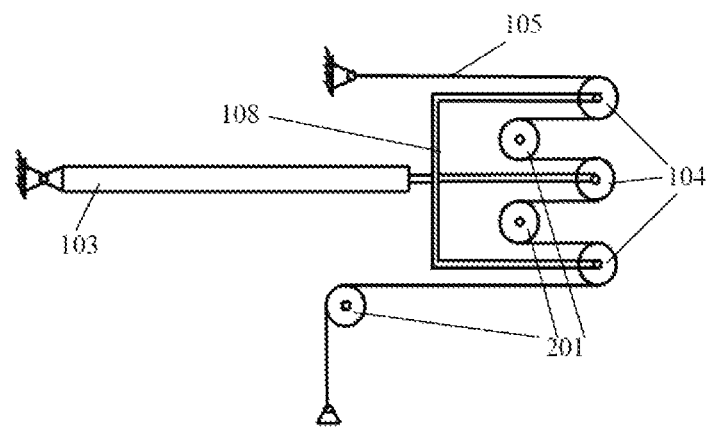
FIG. 5 shows an exemplary non-limiting embodiment of the locations and connections between the air spring, pulley and cable in the embodiment as shown in FIG. 2.
Figure 6:
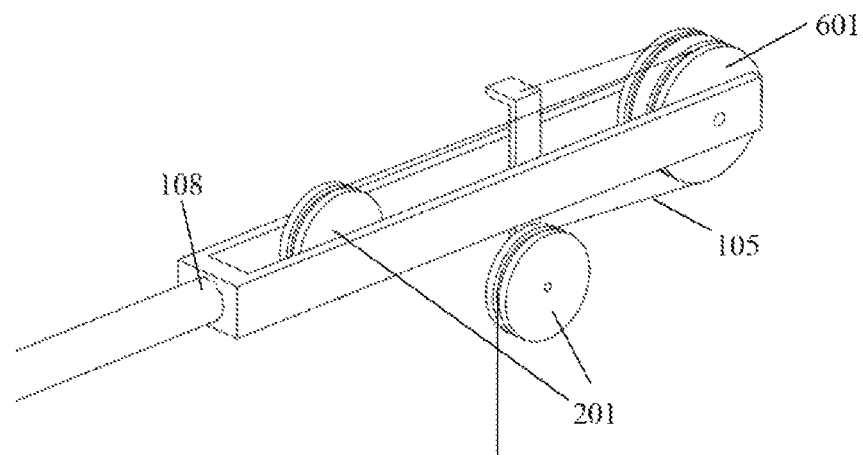
FIG. 6 shows an exemplary non-limiting of the locations and connections between the air spring, pulley and cable in the embodiment as shown in FIG. 2.

With reference to FIGS. 4 and 5, in the display suspension device 200 as shown in FIG. 2, a plurality of movable pulleys 401 and a plurality of fixed pulleys 402 having an identical number to the movable pulleys may also be provided. Accordingly, the cable 105 may wind around each movable pulley and each fixed pulley in sequence, and the piston rod 108 of the air spring 103 may be connected to all movable pulleys. In this way, the travel of the vertical slider 101 may be further increased, so that it may slide in a larger range. With reference to FIG. 6, since the movable pulley 601 in FIG. 6 actually functions as two movable pulleys, the embodiment as shown in FIG. 6 may be regarded as being provided with a plurality of movable pulleys and a plurality of fixed pulleys.

Both in the embodiment as shown in FIG. 1 and in the embodiment as shown in FIG. 2, the suspension part 101 may further comprise a vertical suspension arm 113 and a fixed plate 109. One end of the vertical suspension arm 113 may be connected to the suspension point 107, and the other end of the vertical suspension arm 113 may be connected to the fixed plate 109. In this way, for the display suspension device 100 as shown in FIG. 1, the air spring 103 and the movable pulley 104 may be arranged on the fixed plate 109, one end of the cable 105 may be connected to the fixed plate 109, and the other end may be connected to the vertical slider 101. For the display suspension device 200 as shown in FIG. 2, the air spring 103, the movable pulley 104 and the fixed pulley 201 may be arranged on the fixed plate 109, one end of the cable 105 may be connected to the fixed plate 109, and the other end may be connected to the vertical slider 101.

Both in the embodiment as shown in FIG. 1 and in the embodiment as shown in FIG. 2, the vertical slider 101 may further comprise a main frame 110, which may be of a rectangular shape. The main frame 110 may be provided with a sliding guide 114 (e.g., a guide rail), and the sliding guide 114 may be slidably joined with the guide slot on the suspension part 101. The main frame 110 may be connected with an expansion bracket 111 and a handle 112 for providing an external force for the sliding of the display. The display may be fixed to the main frame 110 by a connector or fixed to an expansion part 111.

In order to prevent the display suspension device from failure after a long period of frequent sliding, especially from the problem of a broken cable, the display suspension device according to at least one exemplary non-limiting embodiment may further comprise a failure protection device, which may prevent the display from sudden falling after the cable is broken. The two embodiments of the failure protection device to be described below are not only suitable for the display suspension device 100 as shown in FIG. 1, but also suitable for the display suspension device 200 as shown in FIG. 2.

Figure 7:
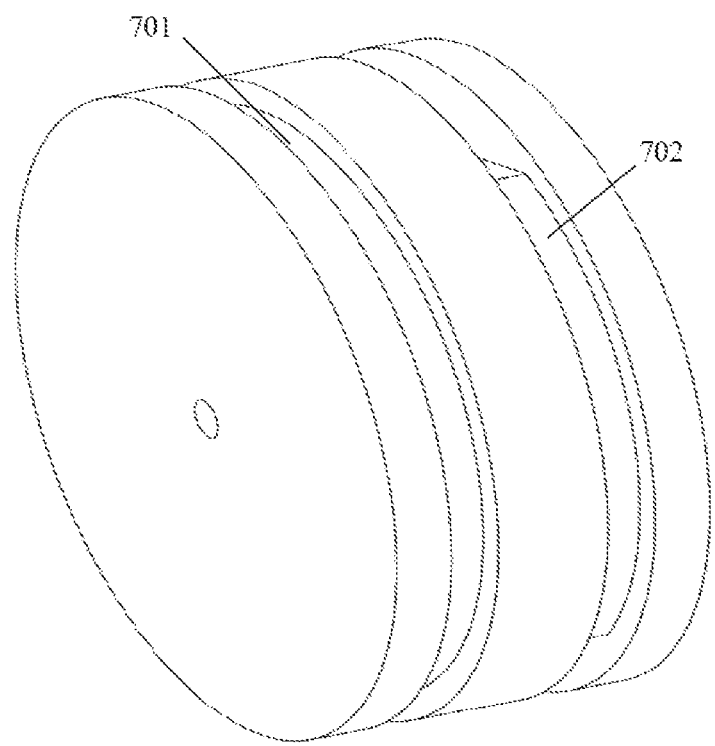
FIG. 7 shows a perspective view of an exemplary non-limiting embodiment of a pulley in the display suspension device.
Figure 8:
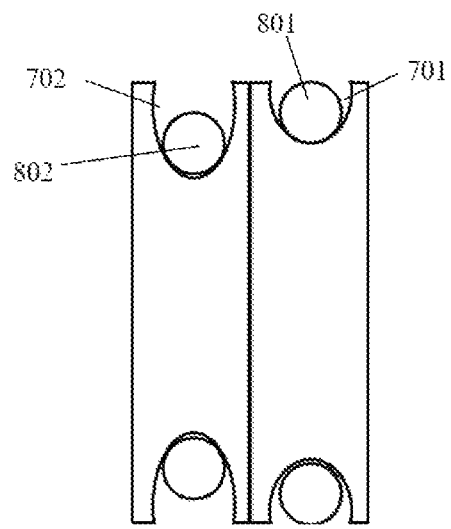
FIG. 8 shows a sectional view of an exemplary non-limiting embodiment of the pulley in the display suspension device.

In an exemplary non-limiting embodiment, with reference to FIG. 7 in conjunction with FIG. 8, the periphery of the movable pulley may be provided with a first groove 701 and a second groove 702. When the display suspension device comprises a fixed pulley, also with reference to the configuration as shown in FIGS. 7 and 8, the periphery of the fixed pulley is provided with a third groove and a fourth groove corresponding in depth to the first groove 701 and the second groove 702, respectively. The depth of the first groove 701 may be less than that of the second groove 702, and the depth of the third groove may be less than that of the fourth groove.

Specifically, each movable pulley may be provided with a first groove and a second groove different in depth, and each fixed pulley is provided with a third groove and a fourth groove. Here, the depth of the first groove may be equal to that of the third groove, and the depth of the second groove may be equal to that of the fourth groove. Accordingly, two cables are used to wind around the pulleys, wherein the first cable 801 may wind inside the first grooves on all the movable pulleys and inside the third grooves on all the fixed pulleys, and the second cable 802 may wind inside the second grooves on all the movable pulleys and inside the fourth grooves on all the fixed pulleys.

In this way, during normal use of the display suspension device, the first cable in the first groove 701 is mainly applied with a drawing force and a frictional force, while the second cable will not have too much wear and only functions as a backup for the first cable, since the second cable is not completely lowered to the bottom of the second/fourth groove or will not have an excessive friction with the groove bottom even if it is in contact with the bottom. When the first cable is broken, the second cable will completely fall to the bottom of the second/fourth groove to replace the first cable, which will prevent the display from falling due to the breaking of the cable.

Figures 9A, 9B, 9C:
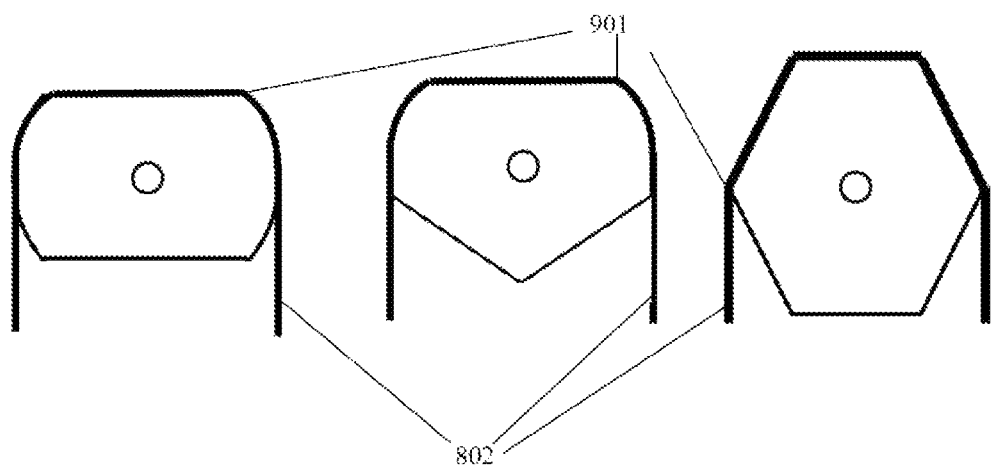
FIGS. 9A, 9B and 9C respectively are three an exemplary non-limiting embodiments of the shape of the second groove in the pulley of the device.

Furthermore, in order to timely alarm the user after the first cable is broken, with reference to FIG. 9, the second groove 702 may further provided with at least one non-arcuate point 901. In this way, when the second cable passes the non-arcuate point 901 during the rotation of the pulley, the user may clearly feel a force that is not smooth, so as to cause an alarm. When the display suspension device comprises a fixed pulley, the non-arcuate point 901 may be either arranged on the second groove on the movable pulley, or on the fourth groove on the fixed pulley, or on both the second groove and the fourth groove.

Figure 10:
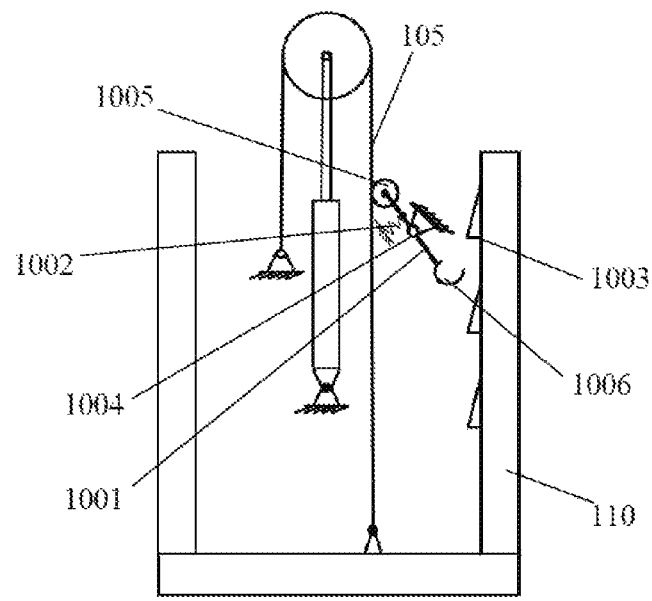
FIG. 10 is a schematic view of an exemplary non-limiting embodiment of a failure protection device of the display suspension devices described herein with the cable being not broken.
Figure 11:
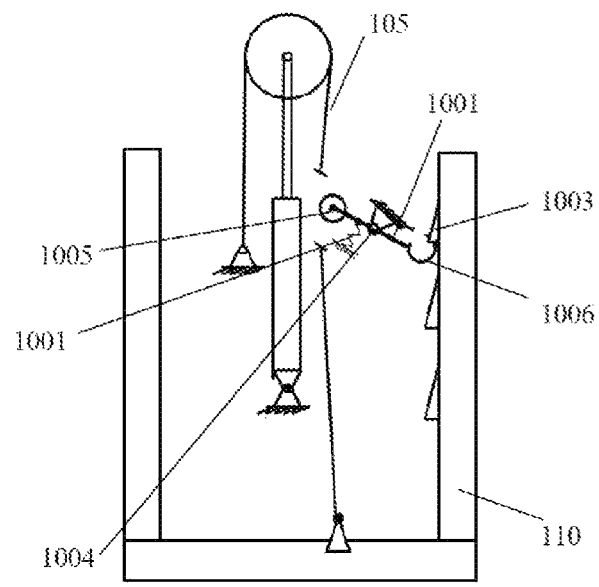
FIG. 11 is a schematic view of an exemplary non-limiting embodiment of a failure protection device of the display suspension devices with the cable being broken.

In another exemplary non-limiting embodiment, with reference to FIG. 10, the failure protection device may comprise a rotary rod 1001, a spring 1002, and an abutting part 1003. The rotary rod 1001 may rotate around the support point 1004, and when the cable 105 is not broken, one end of the rotary rod 1001 is in contact with the cable 105 to receive the tension from the cable 105, and under the action of the tension, the spring 1002 may be in a compressed state. One end of the spring 1002 may be connected to the rotary rod 1001, and the other end may be connected to the main frame 110 of the vertical slider 101. The abutting part may be located in the main frame 110.

When the cable 105 is broken, the rotary rod 1001 may rotate under the action of an elastic force of the spring 1002, so that the other end of the rotary rod 1001 is joined with the abutting part 1003 to stop the movement of the main frame 110. This also stops the falling of the vertical slider 101 and the display installed on the vertical slider.

In at least one exemplary non-embodiment, in order to make the contact of the rotary rod 1001 with the cable 105 more smooth in normal use, one end of the rotary rod may be further connected to a failure protection pulley 1005, and when the cable 105 is not broken, the periphery of the failure protection pulley 1005 is in contact with the cable 105 so as to transfer the tension of the cable 1005 to the rotary rod 1001 and the spring 1002.

In at least one exemplary non-embodiment, in order to abut against the main frame 110 more reliably when the cable 105 is broken, a hook 1006 may be additionally provided on the other end (the end close to the abutting part 1003 of the main frame 110) of the rotary rod 1001, and when the cable 105 is broken, the hook may hook the abutting part 1003.

It should be noted that a display suspension device may employ either of the above two embodiments of the failure protection device or employ both of the two embodiments.

Exemplary non-limiting embodiments of a display suspension device have been described. Said display suspension device(s) may achieve the suspension and sliding of the display with a relatively low cost. Owing to the introduction of pulleys, the air spring may be conveniently arranged in a direction perpendicular or horizontal to the direction in which the display moves vertically according to different application scenarios. Furthermore, failure protection may be provided in the case that the cable is broken so as to prevent the display from falling.

One or more of the exemplary non-limiting embodiments described herein further provide a display device, which may comprise a display suspension device and one or more displays installed on the display suspension device. The display device can achieve the suspension and sliding of the display with a relatively low cost. Owing to the introduction of pulleys, the air spring may be conveniently arranged in a direction perpendicular or horizontal to the direction in which the display moves vertically according to different application scenarios. Furthermore, failure protection may be provided in the case that the cable is broken so as to prevent the display from falling.

The written description uses exemplary non-limiting embodiments to disclose the invention, including the best mode, and also to enable any person skilled in the art to practice the invention, including making and using any devices or systems and performing any incorporated methods. The patentable scope of the invention is defined by the claims, and may include other embodiments that occur to those skilled in the art. Such other embodiments are intended to be within the scope of the claims if they have structural elements that do not differ from the literal language of the claims, or if they include equivalent structural elements with insubstantial differences from the literal language of the claims.

What is claimed is:

1. A display suspension device, comprising:
   a vertical slider, which is connected to a display so as to guide said display to slide in the vertical direction;
   a suspension part, with one end of said suspension part joined with said vertical slider and the other end of said suspension part connected to a suspension point;
   an air spring, which is located on said suspension part and used to retain the location of said vertical slider when said vertical slider stops sliding;
   a movable pulley, a rotation shaft of which is connected to a piston rod of said air spring; and
   a cable, which winds around said movable pulley, with one end of said cable connected to said suspension part and the other end of said cable connected to said vertical slider.

2. The display suspension device according to claim 1, further comprising:
   a fixed pulley, which is fixed to said suspension part;
   wherein said air spring is arranged in a direction perpendicular to the vertical sliding direction, and said cable winds around said movable pulley and said fixed pulley in sequence.

3. The display suspension device according to claim 2, wherein the number of said movable pulleys is equal to the number of said fixed pulleys.

4. The display suspension device according to claim 3, wherein one movable pulley and one fixed pulley are provided.

5. The display suspension device according to claim 3, wherein multiple movable pulleys and multiple fixed pulleys are provided.

6. The display suspension device according to claim 2, wherein a first groove and a second groove are arranged on the periphery of said movable pulley, and a third groove and a fourth groove are arranged on the periphery of said fixed pulley.

7. The display suspension device according to claim 6, wherein the depth of said first groove is less than that of said second groove, and the depth of said third groove is less than that of said fourth groove.

8. The display suspension device according to claim 7, wherein said second groove or said fourth groove is provided with at least one non-arcuate point.

9. The display suspension device according to claim 6, wherein said cable comprises a first cable and a second cable, said first cable winds inside said first groove and inside said third groove, and said second cable winds inside said second groove and inside said fourth groove.

10. The display suspension device according to claim 1, wherein said air spring is arranged in a direction parallel to the vertical sliding direction.

11. The display suspension device according to claim 10, wherein a first groove and a second groove are arranged on the periphery of said movable pulley.

12. The display suspension device according to claim 11, wherein the depth of said first groove is less than that of said second groove.

13. The display suspension device according to claim 12, wherein said second groove is provided with at least one non-arcuate point.

14. The display suspension device according to claim 11, wherein said cable comprises a first cable and a second cable, said first cable winds inside said first groove, and said second cable winds inside said second groove.

15. The display suspension device according to claim 1, wherein said vertical slider further comprises:
- a main frame, which is provided with a sliding guide, said sliding guide being slidably joined with said suspension part.

16. The display suspension device according to claim 15, further comprising:
- a rotary rod, which is rotatable around a support point, wherein when said cable is not broken, one end of said rotary rod is in contact with said cable so as to receive the tension from said cable;
- a spring, with one end of the spring connected to said rotary rod and the other end of the spring connected to said main frame, wherein when said cable is not broken, said spring is in a compressed state under the action of said tension; and
- an abutting part, which is located in said main frame, wherein when said cable is broken, said rotary rod rotates under the action of an elastic force of said spring, so that the other end of said rotary rod prevents said main frame from moving by joining with said abutting part.

17. The display suspension device according to claim 16, further comprising:
- a failure protection pulley, a rotation shaft of which is connected to one end of said rotary rod, wherein when said cable is not broken, the periphery of said failure protection pulley is in contact with said cable.

18. The display suspension device according to claim 17, wherein the other end of said rotary rod is provided with a hook, and when said cable is broken, said hook can hook said abutting part.

19. The display suspension device according to claim 1, wherein said suspension part further comprises: a vertical suspension arm and a fixed plate, wherein one end of said vertical suspension arm is connected to said suspension point, and the other end of said vertical suspension arm is connected to said fixed plate; said air spring and said movable pulley are located on said fixed plate; and one end of said cable is connected to said fixed plate.

20. A display device, comprising:
- a display suspension device comprising:
  - a vertical slider, which is connected to a display so as to guide said display to slide in the vertical direction;
  - a suspension part, with one end of said suspension part joined with said vertical slider and the other end of said suspension part connected to a suspension point;
  - an air spring, which is located on said suspension part and used to retain the location of said vertical slider when said vertical slider stops sliding;
  - a movable pulley, a rotation shaft of which is connected to a piston rod of said air spring; and
  - a cable, which winds around said movable pulley, with one end of said cable connected to said suspension part and the other end of said cable connected to said vertical slider; and
- one or more displays installed on said display suspension device.

* * * * *